United States Patent
Boll et al.

(10) Patent No.: US 7,322,317 B2
(45) Date of Patent: Jan. 29, 2008

(54) HEAT-RECOVERY BOILER

(75) Inventors: Walter Boll, Frankfurt am Main (DE);
Werner Röll, Wächtersbach (DE);
Christoph Erdmann, Hofheim (DE);
Ulrich Wagner, Biendorf (DE);
Thomas Wurzel, Oberursel (DE)

(73) Assignee: Lurgi AG, Frankfurt am Main (DE)

( * ) Notice: Subject to any disclaimer, the term of this patent is extended or adjusted under 35 U.S.C. 154(b) by 0 days.

(21) Appl. No.: 10/545,419

(22) PCT Filed: Feb. 7, 2004

(86) PCT No.: PCT/EP2004/001140

§ 371 (c)(1),
(2), (4) Date: Aug. 10, 2005

(87) PCT Pub. No.: WO2004/083347

PCT Pub. Date: Sep. 30, 2004

(65) Prior Publication Data

US 2006/0075976 A1    Apr. 13, 2006

(30) Foreign Application Priority Data

Mar. 20, 2003  (DE) ................. 103 12 529

(51) Int. Cl.
*F22B 1/18*    (2006.01)
(52) U.S. Cl. .................. 122/7 R; 122/406.3
(58) Field of Classification Search ............ 122/7 R, 122/31.1, 32, 33, 34, 235.17, 44.2, 406.3; 165/158
See application file for complete search history.

(56) References Cited

U.S. PATENT DOCUMENTS

| | | | | |
|---|---|---|---|---|
| 2,003,742 A | * | 6/1935 | Elliott | 122/15.1 |
| 3,318,588 A | * | 5/1967 | Russell et al. | 261/153 |
| 4,418,649 A | * | 12/1983 | Purvis | 122/16.1 |
| 4,871,014 A | * | 10/1989 | Sulzberger | 165/76 |
| 4,899,696 A | * | 2/1990 | Kennedy et al. | 122/135.1 |

* cited by examiner

*Primary Examiner*—Gregory Wilson
(74) *Attorney, Agent, or Firm*—Andrew Wilford

(57) ABSTRACT

The invention relates to a heat-recovery boiler (3) consisting of a tube bundle heat exchanger (7) which is incorporated into a pressure vessel (2) downstream of a gasification device. Displacement bodies (9) are inserted into pipes which are flowed around by hot process gas. According to said invention, in order to avoid corrosion problems like metal dusting, said displacement bodies (9) are made of graphite.

9 Claims, 3 Drawing Sheets

HEAT-RECOVERY BOILER

CROSS REFERENCE TO RELATED APPLICATIONS

This application is the U.S. national phase of PCT application PCT/EP2004/001140 filed 7 Feb. 2004 with a claim to the priority of German patent application 10312529.9 itself filed 20 Mar. 2003.

FIELD OF THE INVENTION

The present invention relates to a heat-recovery boiler comprising a tube bundle heat exchanger permanently incorporated into a pressure vessel downstream from a gasification device, a displacement body that extends over at least a part of the length of the pipe being inserted centrally and coaxially into each of the pipes so that hot process gas flows around it in an annular space formed with the inner surface of the pipe.

BACKGROUND OF THE INVENTION

In the chemical industry, heat-recovery boilers are widely employed to exploit the waste heat from upstream processes for steam generation, in that hot process gases, typically having a temperature from 800 to 1300° C., are cooled and simultaneously high-pressure steam is generated. In this case, deposits may form on the inner surface of the pipes, which significantly impair the heat transfer between the process gas and the coolant liquid flowing around the pipes because of their comparatively low thermal conductivity. The formation of such deposits is to be attributed either to materials existing in the process gases or to those materials which first form in the pipes upon cooling of the process gases. The process of the occurrence of such disadvantageous deposits is referred to in the professional world as "fouling." In order to limit fouling in the pipes, providing the process gases with a sufficient flow velocity is known. However, since the flow velocity may not be elevated unlimitedly for reasons of a pressure loss which rises therewith, displacement bodies are inserted into the cooling pipes in a known way, which serve to either elevate the turbulence of the process gas flow or even elevate its flow velocity locally, as a result of which the deposits of solids are reduced and simultaneously heat transfer is improved. The displacement bodies, which typically are made of metal and are preferably formed as closed insertion tubes, are disadvantageously subject, particularly if the process gases have high concentrations of carbon monoxide, to a significant corrosive attack, referred to as "metal dusting," in a temperature range from 400 to 850° C., preferably 450 to 750° C. Metal dusting is based on the enrichment of the matrix of a metallic material in the surface region with carbon, carbide compounds first arising and, upon further saturation, elementary carbon being precipitated. The material structure is destroyed by the precipitation of the carbon, so that it erodes. A requirement for such erosion is the presence of a potential for carbon formation. This potential may be defined by the following reaction equations in the components of a gas mixture obtained through gasification of carbon:

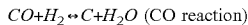  (CO reaction)

 (Boudouard reaction).

The associated equilibrium temperature may be determined for each of the two reactions from the composition of the gas generated by the gasification. Since both reactions run exothermically, a potential for producing carbon exists if the gas falls below at least one of these temperatures as it is cooled. Whether metal dusting actually occurs is decisively a function of the associated kinetics, whose influencing variables are determined by the local temperature and the material. The temperature limit, below which metal dusting no longer occurs for reasons of kinetics, may be viewed as relatively well-established on the basis of experience, however, it is still largely open how suitable different metallic materials are for use above this temperature limit. In principle, all iron and nickel alloys are susceptible to metal dusting, however, a more or less strong occurrence of metal dusting occurs as a function of the further components determining the mechanical-technological properties of alloys. Up to this point, the development of a material resistant to metal dusting has not been successful, nor is there a sufficiently established theory about the detailed procedures during metal dusting.

In general, metal dusting may be avoided if the displacement bodies are only subjected to process gases whose temperatures lie above or below the critical temperature range of 400 to 850° C. In the heat-recovery boiler, the pipes that the hot process gases flow through are cooled to temperatures lying significantly below 400° C. by the coolant liquid surrounding them and the vaporization reaction occurring. Since, however, the use of displacement bodies in the critical temperature range of 400 to 850° C. may not be avoided under all circumstances, it is necessary to consider the risk of metal dusting when selecting the material for the displacement body.

OBJECT OF THE INVENTION

It is the object of the present invention, in the initially described heat-recovery boiler, to provide a displacement body resistant to a corrosive attack by metal dusting which is insertable into the pipes of the tube bundle heat exchanger.

SUMMARY OF THE INVENTION

This object is achieved in that the displacement body comprises graphite.

In order to avoid oscillation of the displacement body in the pipes, centering elements are attached to the periphery of the displacement body, preferably materially bonded to the displacement body.

According to the present invention, the displacement bodies are inserted from the outlet side of the process gases into the pipes and extend over at least 30% of the pipe length.

The displacement bodies are expediently made of multiple sections that are connected via mechanical means made of carbon, such as threaded pins or the like.

The present invention is described in the following in greater detail and for exemplary purposes.

By reacting natural gas with steam and oxygen at a temperature of 970° C., a gas mixture is generated which is composed of 0.1 volume-percent $N_2$, 6.0 volume-percent $CO_2$, 14.5 volume-percent CO, 47.3 volume-percent $H_2$, 0.7 volume-percent $CH_4$, and 31.4 volume-percent $H_2O$. The gas mixture supplied to the cracked gas boiler has a pressure of 30 bar and an effective temperature of 970° C. An equilibrium temperature of 788° C. for the CO reduction and of 820° C. for the Boudouard reaction result from the composition of the gas mixture. This means that when the temperature falls below 820° C., a potential for metal dusting exists. In the tube bundle heat exchanger positioned in the cracked gas boiler, which is referred to as a heat-recovery boiler, that gas mixture is therefore cooled to a temperature of approximately 450° C. The gas mixture contains small quantities of components that produce solid or liquid compounds with $CO_2$ upon cooling in the heat-recovery boiler as a function of temperature. Such components are typically alkaline compounds that are introduced, for example, with the natural gas, steam, and/or oxygen or are dissolved from ceramic masses existing in the reaction system, such as the reactor lining or catalysts. Above all, compounds containing sodium and potassium form solid carbonates upon cooling, which at least partially form deposits on the heat exchanger surfaces and therefore worsen the heat exchange, with the result that the process gas temperature rises to a temperature of approximately 500° C. at the outlet of the heat-recovery vessel. Since such a temperature is harmful to the process unit downstream from the heat-recovery boiler, a closed pipe comprising a nickel-chromium alloy of the type Inconel® 601, which has the highest resistance to metal dusting currently known, is inserted into each of the cooling pipes as a displacement body while forming an annular space with the inner wall surface of the cooling pipe, as a result of which the free cross-section of the cooling pipe is narrowed and the flow velocity of the process gases is elevated so that the outlet temperature of the process gases is reduced to approximately 450° C.

However, it is a significant disadvantage that the displacement bodies partially dissolve after a relatively short service life of only a few weeks because of corrosion and thus significant quantities of rust-like solid are introduced into the condensate of the gas generation facility. The form of the corrosion occurrence and the formation of carbon decisively indicate a material attack by metal dusting. In addition, the nickel released upon corrosion results in damage to catalysts that may possibly be positioned in the process unit downstream from the heat-recovery boiler.

To elevate the resistance, the displacement body comprising Inconel® 601 was additionally coated with a 1.5 mm thick layer made of zirconium silicate as an experiment. As a result, this displacement body was subject to a comparatively even more significant corrosive attack by metal dusting than was the case with the uncoated displacement body.

In contrast, the displacement bodies comprising graphite used according to the present invention have no damage even after a relatively long operating time of more than a year.

Displacement bodies comprising the material Inconel® 601, which were largely destroyed by metal dusting, are illustrated in the photo shown in FIG. 1.

The diagram shown in FIG. 2 shows the course of the corrosion attack by metal dusting along a 3000 mm long displacement body made of the materials Inconel® 601 (dot-dash line), Inconel® 601 coated with zirconium silicate (dashed line), and graphite (solid line). It may be seen that the corrosive attack on the displacement bodies made of the materials Inconel® 601 and Inconel® 601 coated with zirconium silicate is largest in the zones which have the highest temperatures. Accordingly, the corrosive attack falls to 21 0.5 mm up to the end of the displacement bodies. The displacement bodies comprising graphite show no changes.

The present invention will be explained in greater detail for exemplary purposes by FIG. 3 through FIG. 6.

Figure 1:
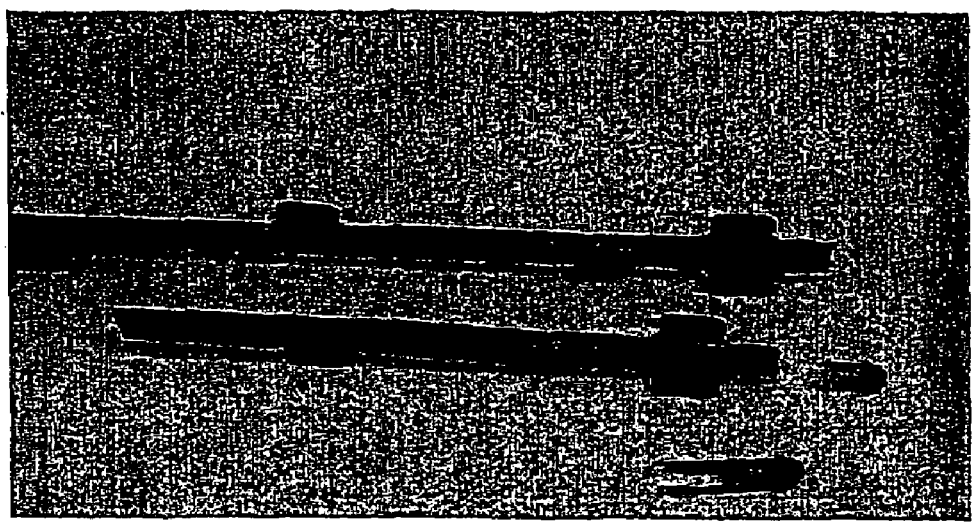
Figure 2:
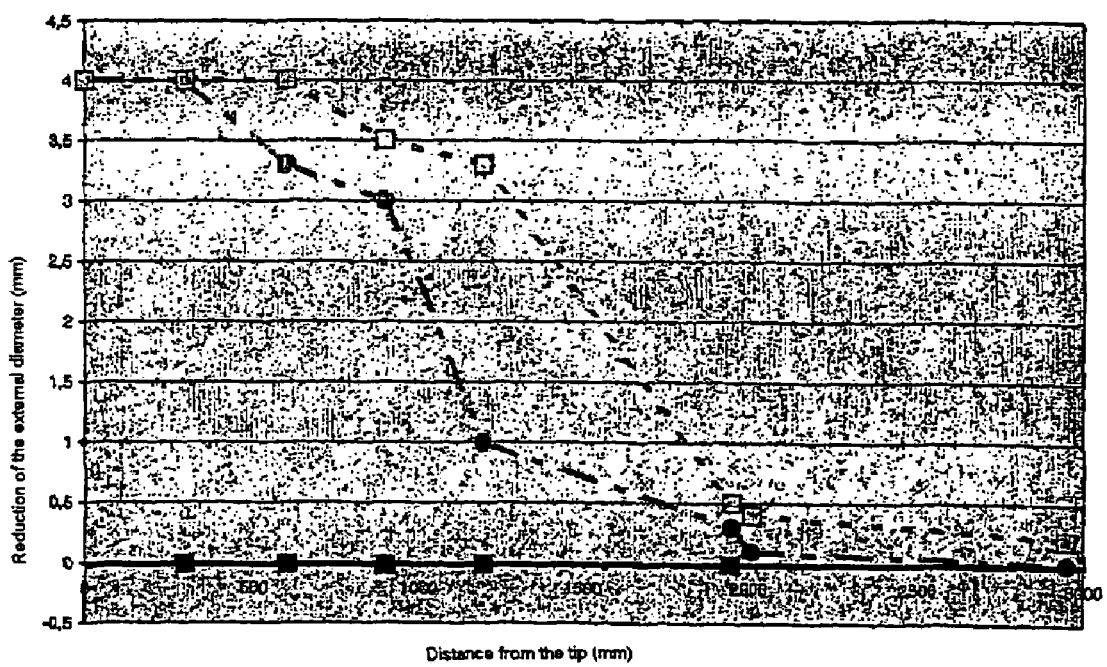
Figure 3:
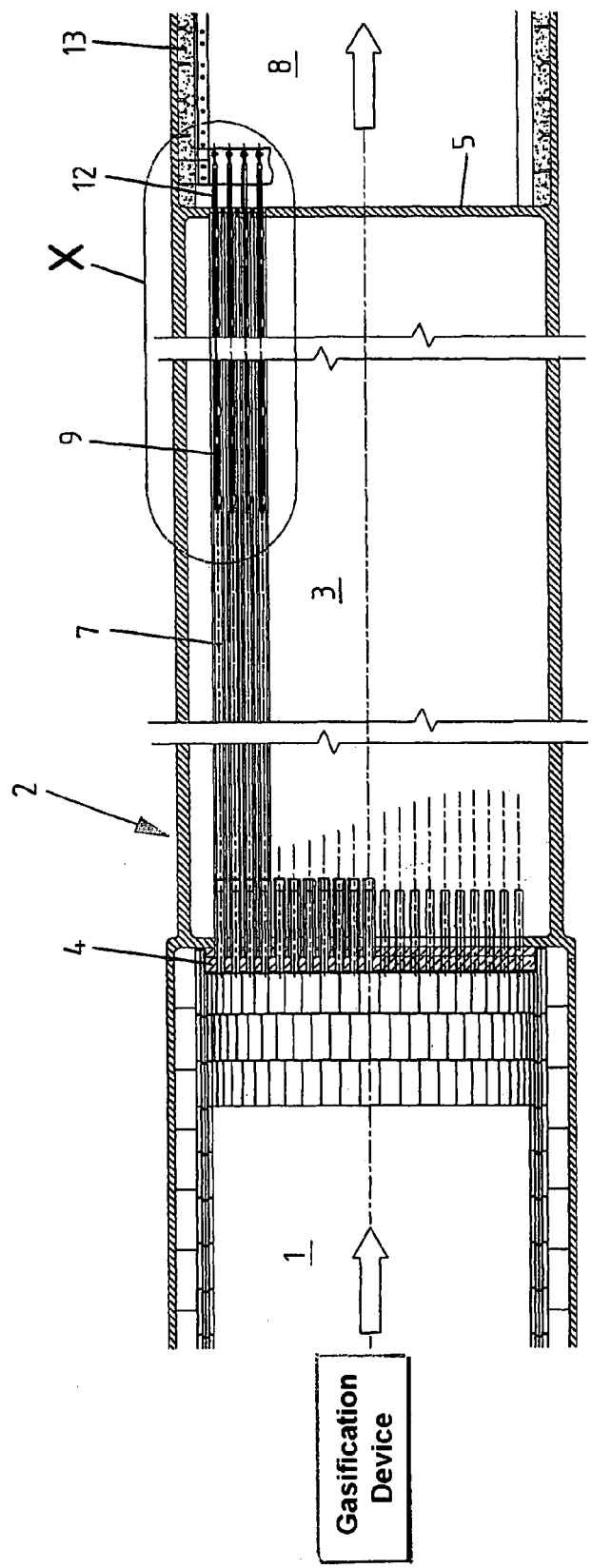
FIG. 3 shows a partial longitudinal section through a cracked gas boiler in the region of the heat-recovery boiler having displacement bodies made of graphite inserted into its cooling pipes
Figure 4:
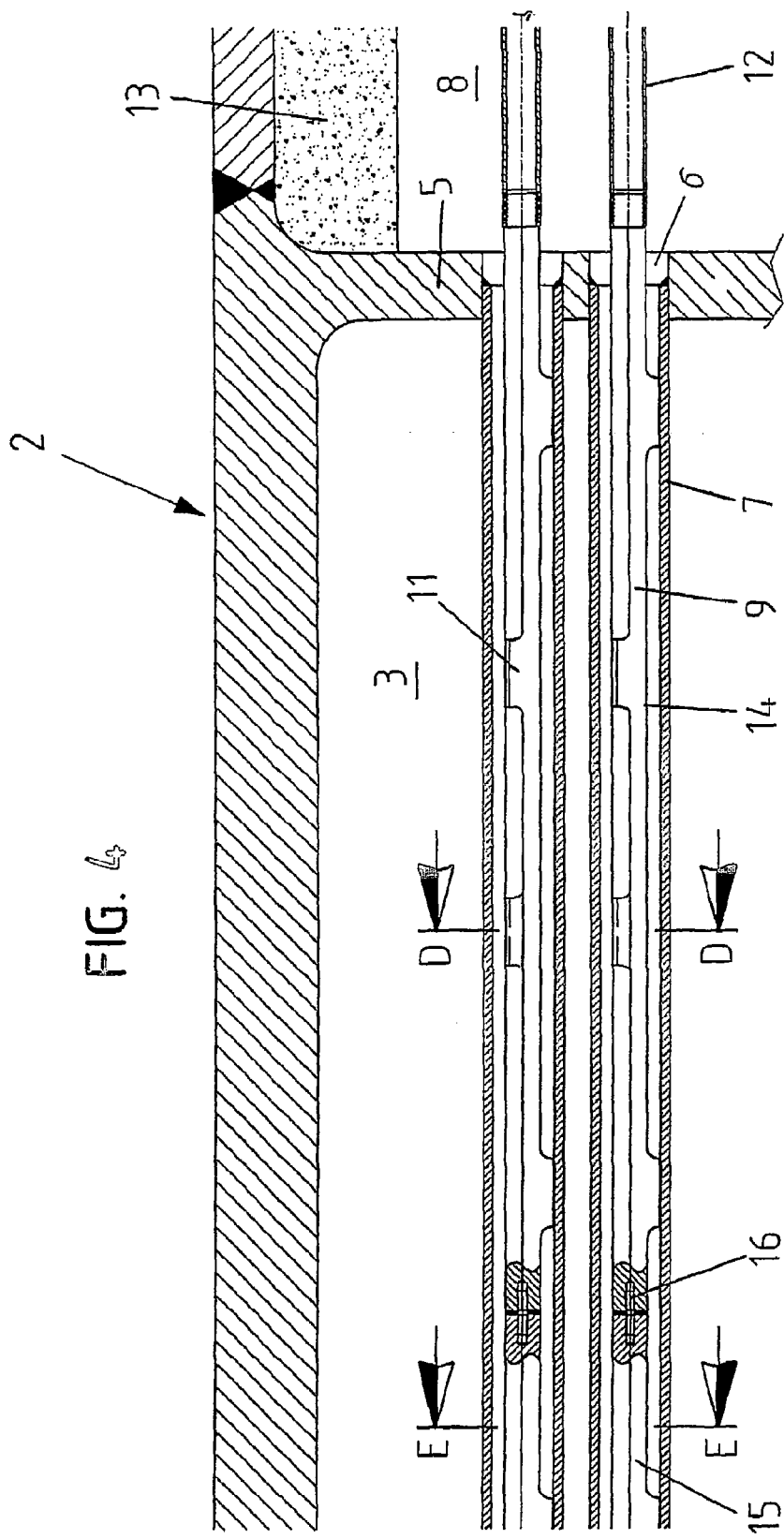
FIG. 4 shows an enlarged illustration of the detail X of FIG. 1
Figure 5:
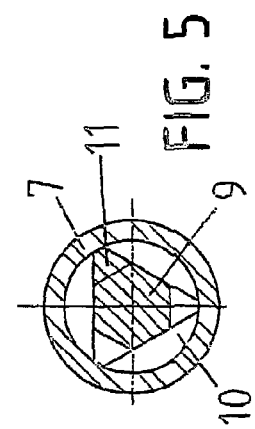
FIG. 5 shows a cross-section along the section line D-D of FIG. 4
Figure 6:
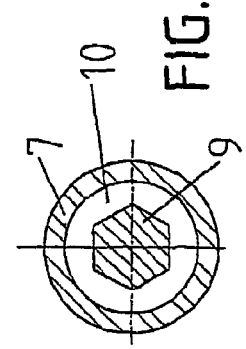
FIG. 6 shows a cross-section along the section line E-E of FIG. 4

By reacting natural gas with steam and oxygen, a gas mixture having a temperature of 970° C. and essentially comprising $H_2$, CO, $CO_2$, $H_2O$, and $CH_4$ is generated that is released via the intake chamber (1) end of the cracked gas boiler (2) to the heat-recovery boiler (3). The heat-recovery boiler (3) contains fixed floor pipes (4, 5) at the gas entry and gas outlet sides, into whose holes (6) the ends of the 3000 mm long cooling pipes (7) are welded. The gas mixture exiting out of the heat-recovery boiler (3) leaves the cracked gas boiler (2) via the outlet chamber (8). A displacement body (9) made of graphite that is hexagonal in cross-section, is inserted concentrically into each of the cooling pipes (7) to form an annular space (10) with the interior of the cooling pipe (7). Centering elements (11) that are triangular in cross-section, are attached to the lateral surface of the displacement body (9) along a spiral line with the tip resting on the interior of the cooling pipe (7). The displacement bodies (9) have a length of 3000 mm and are inserted into the cooling pipes (7) from the side of the gas outlet, a tubular holder (12) being screwed onto each of the end pieces of the displacement bodies (9) projecting past the floor pipes (5) on the gas outlet side. The outlet chamber (8) of the cracked gas boiler (2) is lined with a ceramic layer (13). The displacement bodies (9) each comprise individual sections (14, 15) that are connected to one another via carbon threaded pins (16).

The invention claimed is:

1. In combination with a gasification device producing hot process gases at a temperature of about 800° C. to 1300° C. and containing carbon monoxide, a heat-recovery boiler comprising a pressurized container and a tube bundle heat exchanger permanently installed in the pressurized container and having
a plurality of cooling pipes receiving the gases from the gasification device,
respective displacement bodies made of graphite extending over at least a part of the length of each of the pipes, extending centrally and coaxially in the respective pipes through which the hot process gases flow, and forming an annular space with an inner surface of the respective pipes, and
respective centering elements mounted around the peripheries of the displacement bodies and materially bonded to the respective displacement bodies.

2. The combination according to claim 1 wherein the centering elements are positioned on a line running diagonally or in a spiral to the axis of the cooling pipe.

3. The combination according to claim 1 wherein the displacement body is of circular cross-section.

4. The combination according to claim 1 wherein the displacement body has the cross-section of a regular polygon.

5. The combination according to claim 4 wherein the centering elements are equilateral triangles in cross-section.

6. The combination according to claim 1 wherein the centering elements are equilateral trapezoids in cross-section.

7. The combination according to claim 1 wherein the displacement bodies are inserted into the pipes from an outlet side of the process gases and extend over at least 30% of a length of the pipe.

8. The combination according to claim 1 wherein the displacement bodies are each assembled from multiple sections connected via mechanical means at least partially of carbon.

9. In combination with a gasification device producing hot process gases at a temperature of about 800° C. to 1300° C. and containing carbon monoxide, a heat-recovery boiler comprising a tube bundle heat exchanger permanently installed in a pressurized container and having a plurality of cooling pipes receiving the gases from the gasification device, respective displacement bodies made of graphite extending over at least a part of the length of each of the pipes and extending centrally and coaxially in the respective pipes through which the hot process gases flow and forming an annular space with an inner surface of the respective pipes, and respective centering elements extending radially in multiple cross-sectional planes of the respective displacement bodies, a passage of circular section in cross-section being formed between each two neighboring centering elements.

* * * * *